UNITED STATES PATENT OFFICE 2,127,660

UNSATURATED ESTERS OF 2-CHLOROALLYL ALCOHOL

Gerald H. Coleman and Bartholdt C. Hadler, Midland, Mich., assignors to The Dow Chemical Company, Midland, Mich., a corporation of Michigan No Drawing. Application October 23, 1937, Serial No. 170,647

8 Claims. (Cl. 260—469)

This invention concerns esters of 2-chloroallyl alcohol with unsaturated carboxylic acids; particularly esters having the general formula

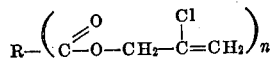

wherein R is a hydrocarbon radical containing at least one ethylenic linkage and $n$ is an integer. All such esters are new compounds useful as intermediates in the preparation of other organic compounds and as modifiers in the polymerization of vinyl compounds, particularly styrene.

The unsaturated esters of 2-chloroallyl alcohol may be prepared by esterifying 2-chloroallyl alcohol with an unsaturated carboxylic acid, e. g. acrylic acid, methacrylic acid, crotonic acid, sorbic acid, fumaric acid, citraconic acid, cinnamic aid, furoic acid, etc. The esterification may be carried out by heating a mixture of 2-chloroallyl alcohol and approximately one chemical equivalent of an unsaturated carboxylic acid, together with a small proportion of a catalyst, e. g. approximately 0.01–0.04 molecular equivalents of a strong acid, such as sulphuric or benzene sulphonic acid, at a temperature of approximately 80°–120° C. Water is formed in the reaction and, if desired, a water-immiscible organic solvent, such as benzene or toluene, may be added for the purpose of promoting the vaporization and removal of water as an azeotropic mixture with the solvent. The reacted mixture is treated with sufficient alkali to neutralize the acid contained therein, after which the ester product is separated by fractional distillation under vacuum.

The following examples illustrate a number of ways in which the principle of our invention may be employed, but are not to be construed as limiting the same:—

Example 1

A mixture of 112.0 grams (1 mol.) of furoic acid, 92.5 grams (1 mol.) of 2-chloroallyl alcohol, and 5 grams of benzene sulphonic acid was heated at 95°–105° C. for 6¾ hours in a flask fitted with dropping funnel, condenser, and receiver arranged in such manner as to permit distillation of water from the mixture. During the heating benzene was added drop-wise to facilitate the distillation of water. The reacted mixture was allowed to cool, dissolved in benzene and washed once with 250 cc. of a 5 per cent aqueous sodium bicarbonate solution and once with 250 cc. of water. Benzene was removed by distillation and the ester product distilled under vacuum. There was obtained 2-chloroallyl furoate, a colorless liquid distilling at 105°–107° C. under 4 millimeters pressure and having a specific gravity of 1.253 at 20/4° C., and a refractive index, $$n_D^{20} = 1.530$$

Example 2

A mixture of 58.0 grams (0.50 mol.) of maleic acid, 92.5 grams (1 mol.) of 2-chloroallyl alcohol, and 5 grams of benzene sulphonic acid was heated at 83°–91° C. for 6 hours. During the heating benzene was added drop-wise to facilitate the distillation of water from the mixture. The reacted mixture was dissolved in benzene and washed with dilute aqueous sodium bicarbonate solution and water. Benzene was removed by distillation and the ester product fractionally distilled. There was obtained 80 grams (60 per cent of the theoretical yield) of di-(2-chloroallyl) maleate, a colorless liquid distilling at 155°–160° C. under 5 millimeters pressure.

Example 3

A mixture of 86.0 grams (1 mol.) of crotonic acid, 92.5 grams (1 mol.) of 2-chloroallyl alcohol, and 5 grams of sulphonic acid was heated at 96°–108° C. for 5 hours as in Example 1. The reacted mixture was dissolved in benzene and washed with dilute aqueous sodium bicarbonate solution and water. Benzene was removed by distillation and the ester product fractionally distilled. There was obtained 131.5 grams (82 per cent of the theoretical yield) of 2-chloroallyl crotonate, a colorless liquid distilling at 65°–67° C. under 4 millimeters pressure, having a specific gravity of 1.102 at 20/4° C., and a refractive index, $$n_D^{20} = 1.4690$$

Example 4

A mixture of 69 grams (0.47 mol.) of cinnamic acid, 43 grams (0.47 mol.) of 2-chloroallyl alcohol, and 2.5 grams of benzene sulphonic acid was heated at 93°–105° C. for 8 hours as in Example 1. The reacted mixture was dissolved in benzene, washed and the product recovered as in Example 1. There was obtained 63.0 grams (59 per cent of the theoretical yield) of 2-chloroallyl cinnamate, a colorless liquid distilling at 153°–155° C. under 4 millimeters pressure, having a specific gravity of 1.171 at 20/4° C., and a refractive index, $$n_D^{20} = 1.5775$$

Example 5

A mixture of 44.3 grams (0.25 mol.) of beta-benzoyl-acrylic acid, 23.1 grams (0.25 mol.) of 2-chloroallyl alcohol, and 2 grams of benzene sulphonic acid was heated at 85°–88° C. for 4½ hours as in Example 1. The reacted mixture was dissolved in benzene, washed, and the product recovered as in Example 1. There was obtained 2-chloroallyl beta-benzoyl-acrylate, a colorless liquid which distills at approximately 175°–185° C. under 4 millimeters pressure, and which polymerizes during distillation to a dark-brown, brittle solid, soluble in acetone, benzene, carbon tetrachloride and other organic solvents.

Other unsaturated esters of 2-chloroallyl alcohol may be prepared from 2-chloroallyl alcohol and unsaturated carboxylic acids. For example, 2-chloroallyl alcohol may be reacted with furylacrylic acid to produce 2-chloroallyl furylacrylate; with oleic acid to produce 2-chloroallyl oleate; with allylacetic acid to produce 2-chloroallyl allylacetate; with linoleic acid to produce 2-chloroallyl linoleate; with beta-chloro-acrylic acid to produce 2-chloroallyl beta-chloroacrylate; etc.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:—

1. An ester of 2-chloroallyl alcohol with an unsaturated carboxylic acid.

2. An unsaturated carboxylic acid ester of 2-chloroallyl alcohol having the general formula

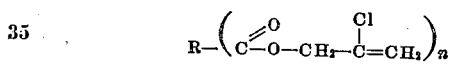

wherein R represents a hydrocarbon group containing at least one ethylenic linkage, and $n$ represents an integer.

3. An unsaturated carboxylic acid ester of 2-chloroallyl alcohol having the general formula

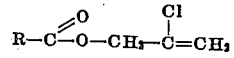

wherein R represents a hydrocarbon group containing at least one ethylenic linkage.

4. An unsaturated carboxylic acid ester of 2-chloroallyl alcohol having the general formula

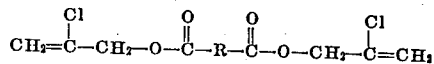

wherein R represents a hydrocarbon group containing at least one ethylenic linkage.

5. An unsaturated carboxylic acid ester of 2-chloroallyl alcohol having the general formula

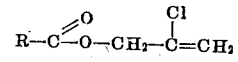

wherein R represents an aralkylene radical containing at least one ethylenic linkage.

6. 2-chloroallyl cinnamate, a colorless liquid distilling at approximately 153°–155° C. under 4 millimeters pressure, and having a specific gravity of 1.171 at 20/4° C. and the formula

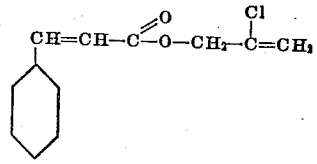

7. 2-chloroallyl crotonate, a colorless liquid distilling at 65°–67° C. under 4 millimeters pressure, and having a specific gravity of 1.102 at 20/4° C. and the formula

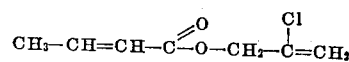

8. Di-(2-chloroallyl) maleate, a colorless liquid distilling at approximately 155°–160° C. under 5 millimeters pressure, and the formula

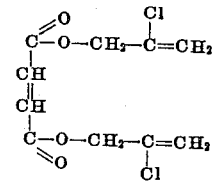

GERALD H. COLEMAN.
BARTHOLDT C. HADLER.